J. F. WEBER.
FLOOR SCRAPER.
APPLICATION FILED JUNE 1, 1908.
954,485.
Patented Apr. 12, 1910.
2 SHEETS—SHEET 1.
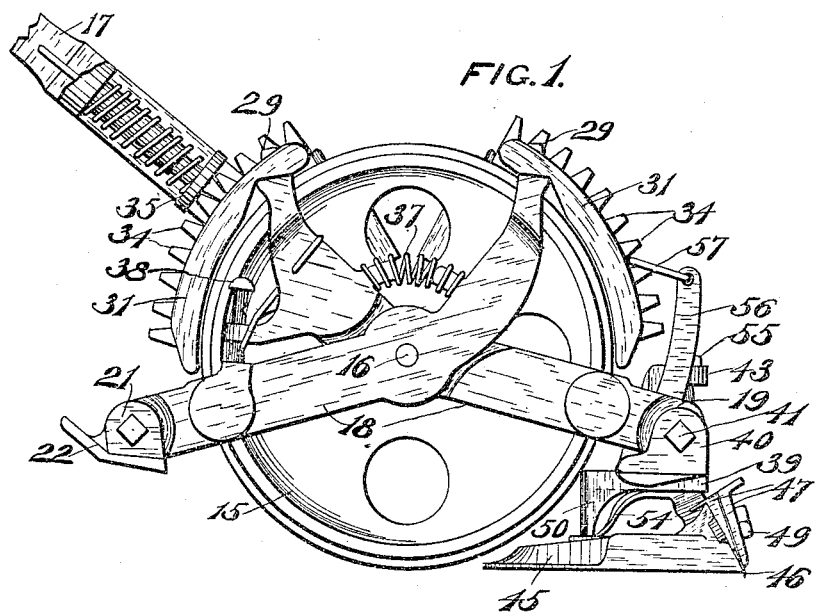
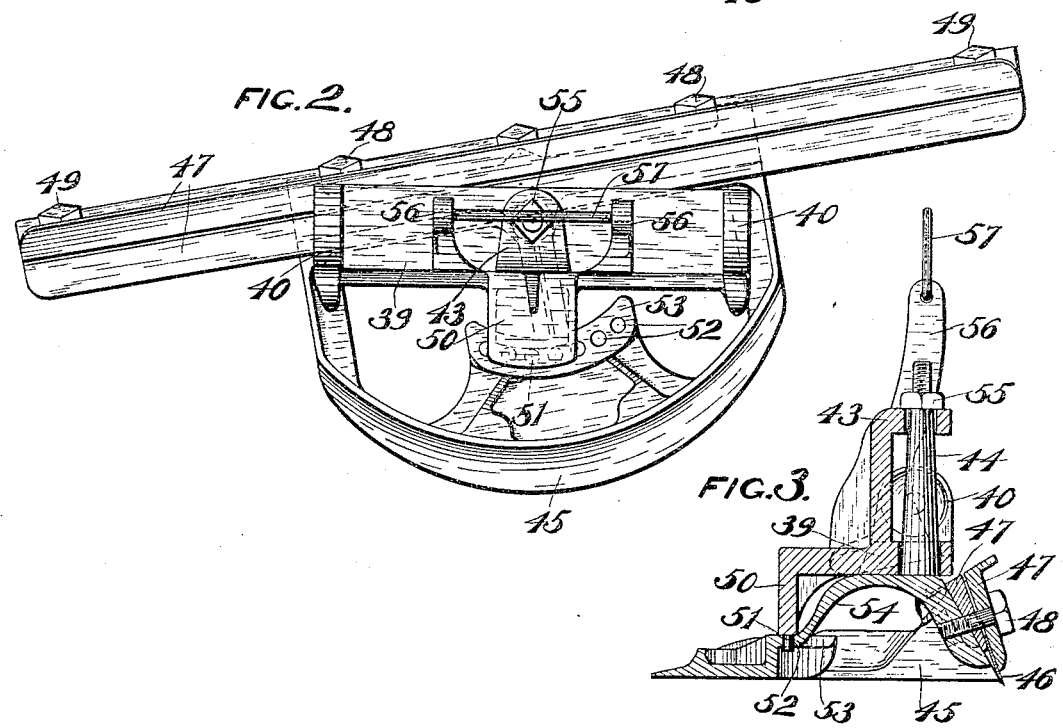
WITNESSES
INVENTOR.
John F. Weber,
By Benedict, Morsell & Caldwell
ATTORNEYS.

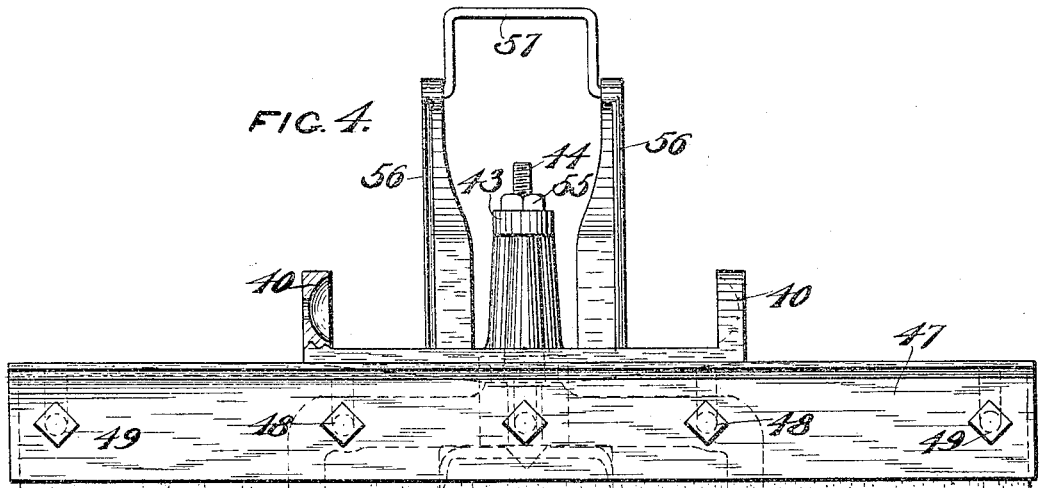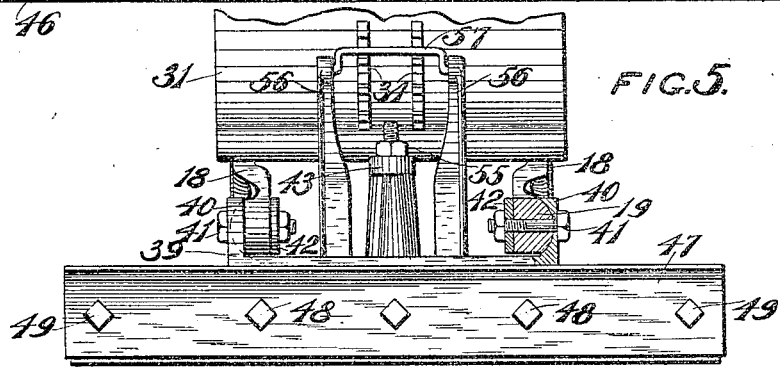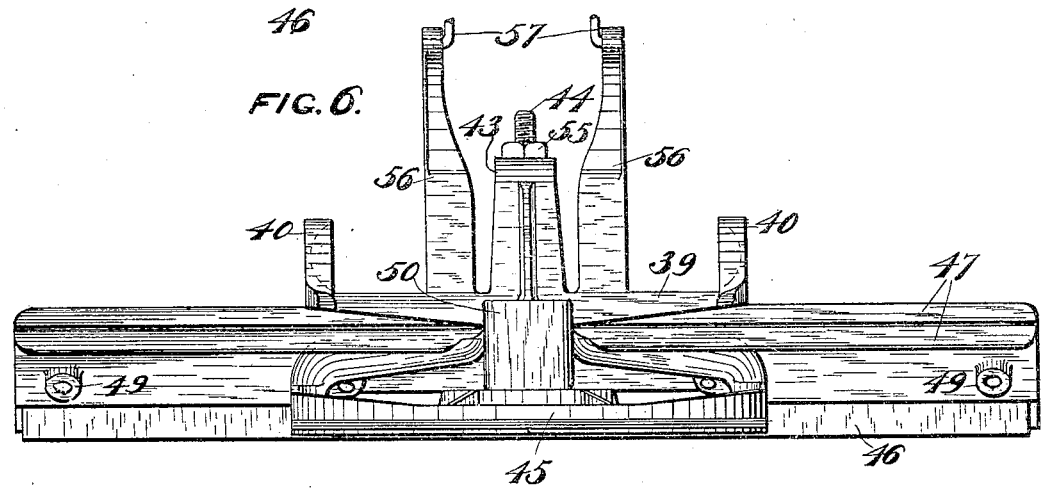

UNITED STATES PATENT OFFICE.

JOHN F. WEBER, OF WEST ALLIS, WISCONSIN.

FLOOR-SCRAPER.

954,485.  Specification of Letters Patent.  Patented Apr. 12, 1910.

Application filed June 1, 1908. Serial No. 436,107.

*To all whom it may concern:*

Be it known that I, JOHN F. WEBER, residing in West Allis, in the county of Milwaukee and State of Wisconsin, have invented new and useful Improvements in Floor-Scrapers, of which the following is a description, reference being had to the accompanying drawings, which are a part of this specification.

This invention has for its object to provide a floor scraper with an adjustable scraper blade which may be swung at different angles with relation to the draft of the machine.

With the above and other objects in view the invention consists in the floor scraper herein claimed, its parts and combinations of parts and all equivalents.

Referring to the accompanying drawings in which like characters of reference indicate the same parts in the several views; Figure 1 is a side elevation of a floor scraper constructed in accordance with this invention, the operating handle being broken away; Fig. 2 is a plan view of the adjustable blade holder; Fig. 3 is a transverse sectional view thereof; Fig. 4 is a front elevation thereof with one of the attaching ears in section; Fig. 5 is a similar view thereof attached in position on a carrier, one of the connections being in section; and, Fig. 6 is a rear elevation of the adjustable blade holder.

While the invention is here shown as a modification of a floor scraper and planer covered by my copending application for Letters Patent bearing Serial Number 386,263 and the adjustable blade holder thereof constitutes an attachment for the frame of the structure covered by my copending application to replace one of the blade holders thereof, it is to be understood that the present invention may constitute a machine complete in itself and is not necessarily an attachment for the machine of such copending application.

In these drawings 15 indicates a pair of wheels, which are preferably rubber tired and which are loosely mounted on an axle 16 carried by the yoke arms of a forked handle member 17. A pair of crossed rods 18 are formed and connected together like the members of a pair of shears and are loosely mounted on the axle 16 at each end thereof between the wheels 15 and the ends of the handle 17. Each member 18 has a half ball shaped lower end 19, those of two of the members fitting within concave recesses or sockets in end ears 21 of a plate 22 which serves to connect them. Each of the members 18 also has its upper end curved upwardly and terminates in a shouldered pin 29 to loosely fit within an opening in the upper corner of a sector shaped weight 31, there being one of these weights suspended in this manner on each side of the axle. Each weight 31 has connection with the axle, which is not shown in the drawings, and is provided with one or more series of stops or rack teeth 34 on its curved upper surface concentric with the axle, to be engaged by a spring pawl 35 carried by the handle 17.

So much of the structure as has been described is similar to the structure covered by my copending application above referred to, and the parts mentioned only differ from those in the copending application in details of construction, such as the coil springs 37 confined between lugs on the crossed rods 18 to force the weighted ends thereof apart, and the spring locked adjustment pins 38 on two of the rods 18 bearing against the other rods 18 to determine their position with relation to each other by limiting the movement caused by springs 37.

The adjustable blade holder of this invention comprises a frame 39 having a pair of upstanding recessed ears 40 on its ends to fit upon the half ball shaped projections 19 of the carrier frame, there being bolts 41 passing through these connections with rubber or other yielding gaskets 42 to cause the parts of the connections to bear tightly against each other. The frame 39 has an upstanding bracket 43 at its middle part with an opening passing therethrough and another through the frame to form a double bearing for a tapering stem 44 of a guide shoe 45, which is somewhat of a horse-shoe shape and is adapted to bear flat on the floor and form a steady rest or guide for a scraper blade 46. The scraper blade 46 is clamped to the beveled straight edge of the shoe 45 between a pair of jaw plates 47 by means of bolts 48 passing through the jaw plates and threaded into the shoe 45. The scraper blade and the jaw plates 47 may be of any desired length and are preferably somewhat longer than the shoe 45, as shown and in addition to the bolts 48 there are bolts 49 connecting the jaw plates 47 near their ends to tightly clamp them upon the scraper blade, the scraper blade being preferably slotted at its upper edge to receive the bolts 48 and 49. The frame 39 has a downwardly extending projection 50 at some distance from the axis of the stem 44 of the shoe, such projection terminating in a rounded pin 51 adapted to enter any one of a series of openings 52 in an arc shaped sector 53 formed on the shoe and forming part of an arched brace 54 extending from the curved portion to the straight portion of the shoe and carrying the stem 44. A nut 55 is threaded on the upper end of the stem 44 and bears on the top of bracket 43, but when turned back it permits the shoe 54 to move downwardly to release the engagement of pin 51 from the openings 52, so that the shoe may be swung upon its swivel support formed by the stem 44 in the double bearing of the frame to the angle desired for the scraper blade with relation to the draft of the carrier, when the pin 51 may be entered in another of the openings 52 and by tightening the nut 55 the parts are again clamped in their operative relation.

In order to steady the blade holder during the operation, and prevent its tilting, the frame 39 thereof has a pair of upstanding arms 51 with a bail loop 57 pivotally mounted therein and adapted to engage between the teeth 34 of one of the weights 31. By slightly lifting said weight 31 before engaging the bail loop 57 the pressure of spring 37 as well as the pressure of said weight serve to make this connection secure and prevent chattering or other vibrating or tilting movement of the blade holder.

The shoe 45 by its extended flat bearing surface riding on the floor serves to steady the scraper blade and keep it in its proper angular position with relation to the floor, and the adjustment of the shoe with relation to the frame of the blade holder locks the scraper blade in the desired angular position with relation to the draft of the machine.

The bail loop 57 forms a convenient handle for carrying the blade support when it is detached from the carrier.

The advantages of the adjustability of the blade holder, whereby either end of the scraper blade may be carried in advance of the other, are apparent to those skilled in the art, as resulting in a more rapid operation and in cleaner work.

What I claim as my invention is;

1. A floor scraper, comprising an axle, a pair of wheels mounted thereon, an operating handle connected with the axle, pairs of crossed arms mounted on the axle, weights carried by the crossed arms, one of the weights being engaged by the operating handle, a frame pivotally mounted on the crossed arms by which said weight is carried, projecting arms on the frame, a bail loop mounted on said arms and engaging the other weight, a guide shoe bearing on the floor and pivotally connected to the frame, and a scraper blade carried by the shoe.

2. A floor scraper, comprising an axle, a pair of wheels mounted thereon, an operating handle connected with the axle, pairs of crossed arms mounted on the axle, weights carried by the crossed arms and having rack teeth to be engaged by the operating handle, half ball shaped projections on the ends of the crossed arms which carry the weight engaged by the operating handle, a frame having recessed ears fitting on the half ball shaped projections, arms on the frame, a bail loop mounted on the arms and engaging the rack teeth of the other weight for locking the frame against movement and adapted to constitute means for carrying the frame when disconnected from the crossed arms, a guide shoe bearing on the floor and pivotally connected to the frame, and a scraper blade carried by the guide shoe.

3. A floor scraper, comprising an axle, a pair of wheels mounted thereon, an operating handle connected with the axle, pairs of crossed arms mounted on the axle, weights carried by the crossed arms and having rack teeth to be engaged by the operating handle, half ball shaped projections on the ends of the crossed arms which carry the weight engaged by the handle, a frame having recessed ears fitting on the half ball shaped projections, arms on the frame, a bail loop mounted on the arms and engaging the rack teeth of the other weight for locking the frame against movement and adapted to constitute means for carrying the frame when disconnected from the crossed arms, a guide shoe bearing on the floor, a stem projecting therefrom, an extension bracket on the frame, there being openings in the frame and the extension bracket to receive the stem and constitute a pivotal bearing therefor, a nut threaded on the end of the stem and engaging the extension bracket, a pin on the frame, there being a series of openings in the guide shoe arranged about the axis of the stem as a center and adapted to receive the pin in the pivotal adjustments of the guide shoe, a pair of clamping jaw plates secured to the guide shoe, and a scraper blade held between the clamping jaw plates.

In testimony whereof, I affix my signature, in presence of two witnesses.

JOHN F. WEBER.

Witnesses:
R. S. C. CALDWELL,
ANNA F. SCHMIDTBAUER.